United States Patent
Ogawa et al.

(10) Patent No.: US 7,471,602 B2
(45) Date of Patent: Dec. 30, 2008

(54) RECORDING/REPRODUCING METHOD AND RECORDING/REPRODUCING APPARATUS AND OPTICAL DISK

(75) Inventors: Akihito Ogawa, Kawasaki (JP); Yutaka Kashihara, Chigasaki (JP); Hideki Takahashi, Kashiwa (JP); Yutaka Yamanaka, Tokyo (JP); Shigeru Shimonou, Tokyo (JP); Tatsunori Ide, Tokyo (JP)

(73) Assignees: Kabushiki Kaisha Toshiba, Tokyo (JP); NEC Corporation, Tokyo (JP)

( * ) Notice: Subject to any disclaimer, the term of this patent is extended or adjusted under 35 U.S.C. 154(b) by 631 days.

(21) Appl. No.: 11/127,223

(22) Filed: May 12, 2005

(65) Prior Publication Data

US 2005/0254412 A1   Nov. 17, 2005

(30) Foreign Application Priority Data

May 14, 2004   (JP)   ............... 2004-144982

(51) Int. Cl.
   G11B 7/00   (2006.01)
(52) U.S. Cl. .................. 369/53.24; 369/53.22
(58) Field of Classification Search ........... None
   See application file for complete search history.

(56) References Cited

U.S. PATENT DOCUMENTS

| | | | |
|---|---|---|---|
| 6,724,705 B1 * | 4/2004 | Ko et al. ............. | 369/53.21 |
| 7,002,882 B2 * | 2/2006 | Takahashi ........... | 369/47.14 |
| 7,292,524 B2 * | 11/2007 | Ando et al. ......... | 369/275.3 |
| 2001/0040846 A1 | 11/2001 | Kawashima et al. | |
| 2003/0185120 A1 | 10/2003 | Morozumi et al. | |
| 2003/0227846 A1 | 12/2003 | Lee et al. | |

FOREIGN PATENT DOCUMENTS

| | | |
|---|---|---|
| JP | 2002-230769 | 8/2002 |
| JP | 2003-272157 | 9/2003 |
| JP | 2004-86960 | 3/2004 |
| TW | 1226610 | 1/2005 |

OTHER PUBLICATIONS

ECMA Standardizing Information and Communication System: 80mm (1,46 Gbytes per side) and 120 mm (4,70 Gbytes per side) DVD Re-recordable Disk (DVD-RW), XP 002339283, Dec. 2002, pp. I-VI and 1-148.

* cited by examiner

*Primary Examiner*—Joseph Feild
*Assistant Examiner*—Joseph Haley
(74) *Attorney, Agent, or Firm*—Oblon, Spivak, McClelland, Maier & Neustadt, P.C.

(57) ABSTRACT

An optical disk medium in which a learning area can be expanded, an optical disk information recording method and an optical disk apparatus are provided. A first lead-in area and second lead-in area are provided on the inner side and outer side of a data area. The first lead-in area includes a first learning area, management information recording area and data connection area and the second lead-in area includes a protection area which protects the user data in the inner portion thereof and a second learning area which is provided on the outer side of the protection area and sets an optimum condition for an operation of recording data into the data area. An area in which information indicating the utilization state of the protection area is recorded is prepared in one of the management information recording area and data connection area.

2 Claims, 7 Drawing Sheets

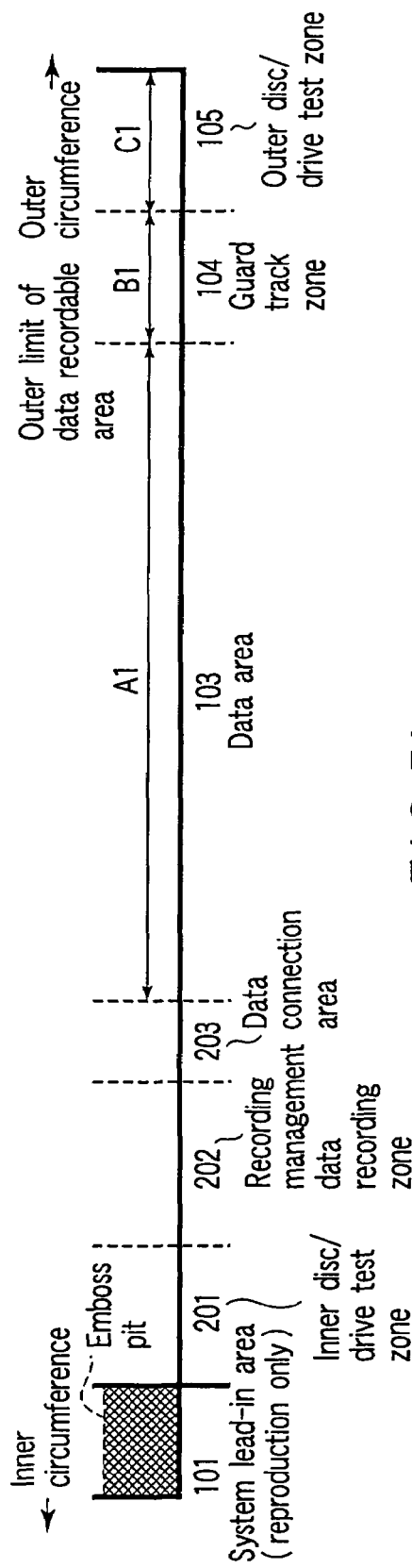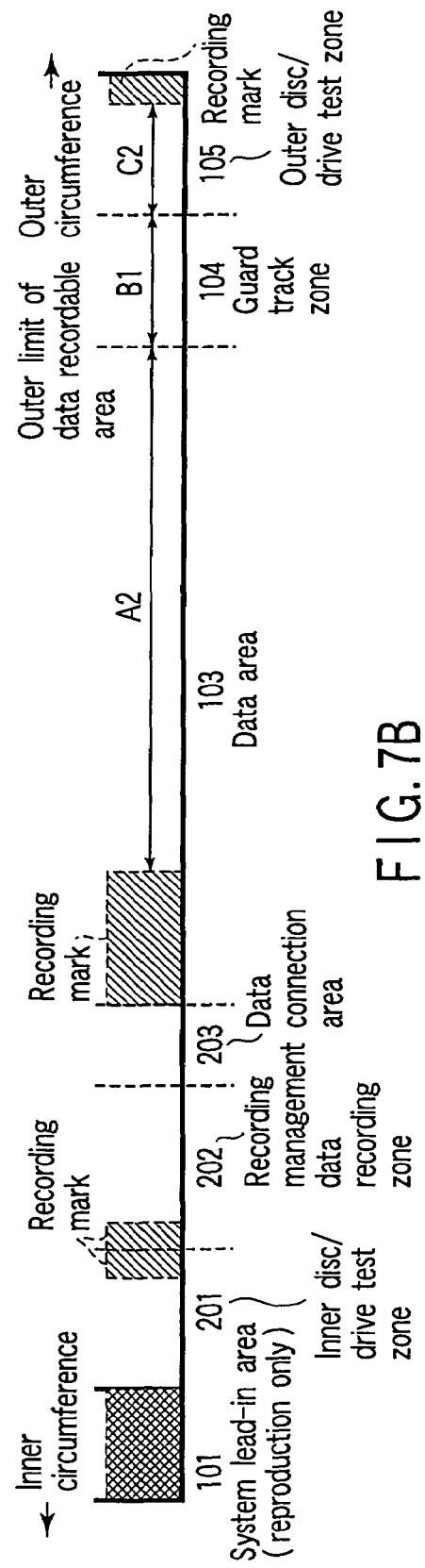
FIG. 7A
FIG. 7B

RECORDING/REPRODUCING METHOD AND RECORDING/REPRODUCING APPARATUS AND OPTICAL DISK

CROSS-REFERENCE TO RELATED APPLICATIONS

This application is based upon and claims the benefit of priority from prior Japanese Patent Application No. 2004-144982, filed May 14, 2004, the entire contents of which are incorporated herein by reference.

BACKGROUND OF THE INVENTION

1. Field of the Invention

This invention relates to an optical disk recording/reproducing method and recording/reproducing apparatus and an optical disk and more particularly to a management method for managing a learning region of an optical disk.

2. Description of the Related Art

As is well known in the art, recently, an optical disk having a recoding capacity of 4.7 GB on one surface is put to practical use as an optical disk capable of recording information with high density. For example, a rewritable DVD-RAM (ECMA-330) and additionally writable +R (ECMA-349) and DVD-R (ECMA-338) and the like are provided.

Information is recorded/reproduced with respect to the above optical disk by forming an information recording layer on a transparent substrate and condensing laser light thereon. The strength of laser light is adequately changed according to the reproduction, recording and erase operations. Further, the optimum strengths of laser light at the recording time and erase time are inherently set for the respective optical disks. Therefore, in the optical disk apparatus, the strength of recording laser light is controlled to an optimum value (OPC: Optimum Power Control) when information is recorded on the optical disk. For example, in DVD-R, the strength of recording laser light is controlled to an optimum value (OPC) by recording and reproducing preset test information in a power calibration area which is an area set on the optical disk to learn the laser light strength before user information or the like is recorded.

As shown in an example disclosed in Jpn. Pat. Appln. KOKAI Publication No. 2003-168216, the information area used for learning the laser light strength is previously provided with a certain amount of recording capacity in a specified position on the internal circumference side or outer circumference side with respect to the user information recording area of the disk. As a result, user information and the user information recording area are prevented from being destroyed by learning the laser light strength in the user information recording area.

Generally, the operation of learning the laser light strength is performed before information is first recorded after the disk is inserted or before information is recorded after a long period of time has elapsed from the preceding learning operation or after the environment condition of temperature or the like is changed. In this case, the learning area may be used up earlier than the user recording area is used up in some cases. For example, this happens in a case where the learning operation is not satisfactorily performed and a large part of the learning area is consumed, where a small amount of data is intermittently recorded with certain time intervals or where defects are present in the learning area. In such a case, if the learning area is previously provided with preset recording capacity in a specified portion on the internal circumference side or outer circumference side of the disk, there occurs a possibility that the entire portion of the learning area is used up although the user information recording area still has available remaining capacity.

The above problem tends to occur in the additionally writable disk. Since the strength of laser light for writing cannot be controlled to an optimum value if the learning area is used up, there are problems that the recording operation cannot be performed and the recording capacity substantially decreases even if an attempt is made to newly record user information in the user information recording area.

BRIEF SUMMARY OF THE INVENTION

An object of the embodiments is to provide an optical disk medium in which a learning area can be expanded, an optical disk information recording method and an optical disk apparatus.

In one embodiment of this invention, there is provided an optical disk medium on which information can be recorded and which comprises a data area in which user data is recorded, a first lead-in area provided inside the data area and a second lead-in area provided outside the data area, wherein the first lead-in area includes a first learning area used to set an optimum condition for an operation of recording data in the data area, a management information recording area which manages the user data recorded in the data area and a data connection area, the second lead-in area includes a protection area which protects the user data in an inner portion and a second learning area which is provided outside the protection area and sets an optimum condition for an operation of recording data in the data area, and an area in which information indicating a utilization state of the protection area is recorded is provided in one of the management information recording area and data connection area.

According to the above embodiment, since the protection area is provided between the data area and the second learning area, it is possible to prevent user data from being destroyed at the time of learning and prevent user data from being erroneously recorded in the learning area. Further, since the area which records information indicating the utilization state of the protection area is provided, the protection area can be used to serve a plurality of purposes.

Additional objects and advantages of the embodiments will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIGS. 7A to 7C are explanatory diagrams showing variations in the capacity on the optical disk, for illustrating the operation of the apparatus according to this invention;

DETAILED DESCRIPTION OF THE INVENTION

There will now be described one embodiment of this invention with reference to the accompanying drawings.

[Explanation for Optical Disk]

An additionally writable optical disk which is one example of an embodiment of this invention can record or reproduce information by forming an information recording layer on a transparent substrate and condensing laser light thereon. As the structure of an information recording/reproducing portion, the transparent substrate of the optical disk has guidance grooves which are called grooves. The information recording/reproducing operation is performed along the guidance groove. Further, physical addresses used to specify a spatial position in which information is to be recorded/reproduced are formed. As physical address forming means, a groove-wobble modulation (which is hereinafter referred to as wobble modulation) method in which the guidance groove is vibrated in the radial direction is used. The wobble modulation method is a method for changing the wobble phase or frequency according to information to be recorded. Since the physical address formed by the wobble modulation method does not cut off the recording track, it is possible to attain the advantages that an area in which user information is recorded is large, that is, the format efficiency is high and compatibility with reproduction-only media can be easily attained.

A recording material such as a multi-layered inorganic material or an organic coloring material is used as an information recording layer. Recording pits (or recording marks) are formed by condensing laser light of high power onto the information recording layer and thus information is recorded on the optical disk.

(Explanation for Zone Layout of Optical Disk)

Figure 1:
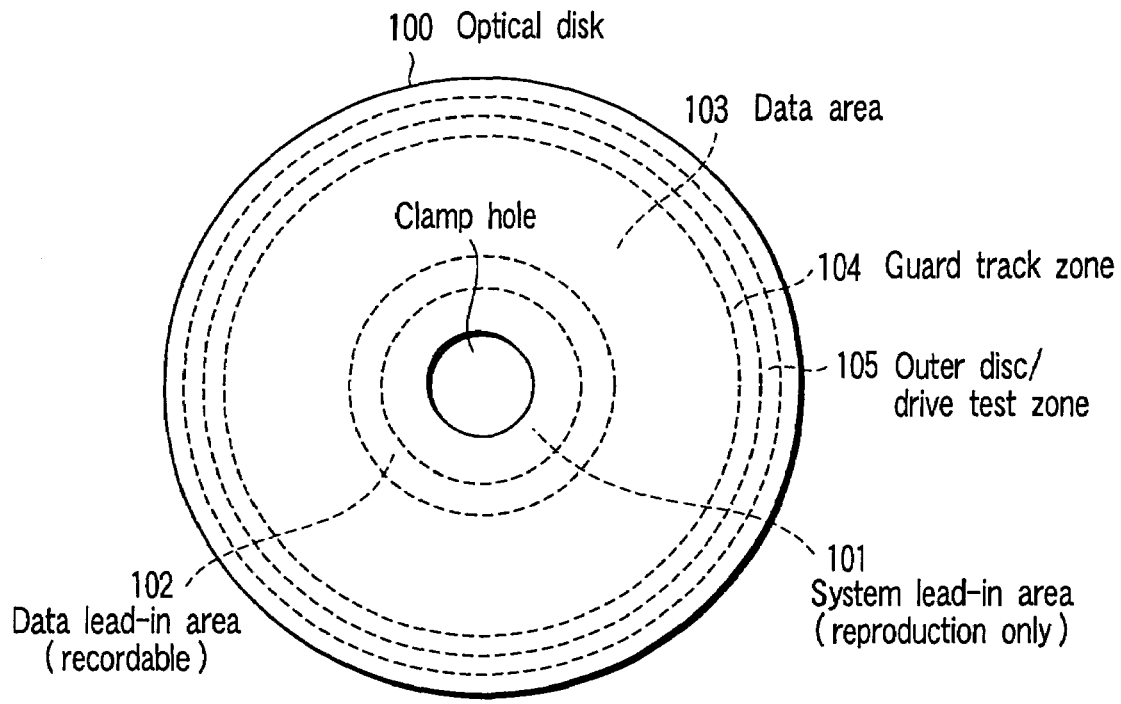
FIG. 1 is a view showing an example of the area configuration of an information recording layer of an optical disk according to this invention.

The configuration of areas of the information recording layer of an optical disk is shown in FIG. 1. An optical disk 100 of this invention has a plurality of areas in the radial direction and types of information items to be recorded in the respective areas are previously determined. The information recording layer is roughly divided into a system lead-in area 101 which is reproduction-only and composed of control data, physical format information and so on, Data lead-in area 102 which is recordable, user information recordable area or data area 103 which records user data, Guard track zone 104 which area is located for protecting user data against over running of write power testing process in test zone 105 and outer disc or drive test zone 105 which is used for writing test data to optimize write power and waveform.

In the system lead-in area 101, information is recorded by use of emboss pits. A Groove is formed in the data lead-in area, data area, guard track zone, Outer test zone and so on.

Figure 3:
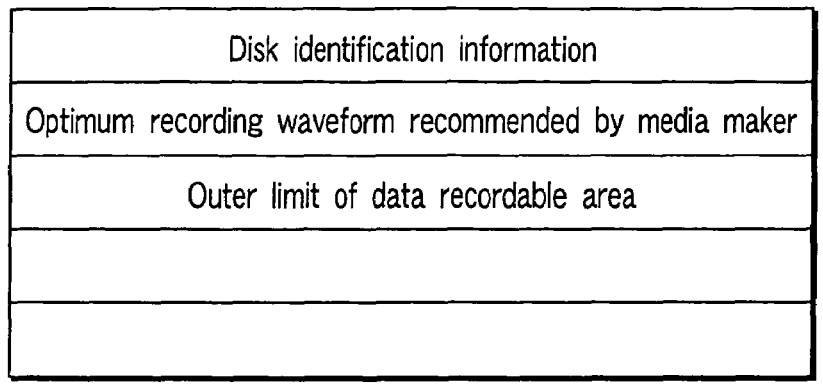
FIG. 3 is a diagram showing an example of the information contents of a system lead-in area 101 shown in FIG. 1.

In the system lead-in area 101, as shown in FIG. 3, disk identification information, an optimum recording waveform which the media maker recommends, Outer limit of data recordable area which indicates the end position address of the data area of the disk in the initial state and the like are previously recorded with emboss pits.

Figure 2:
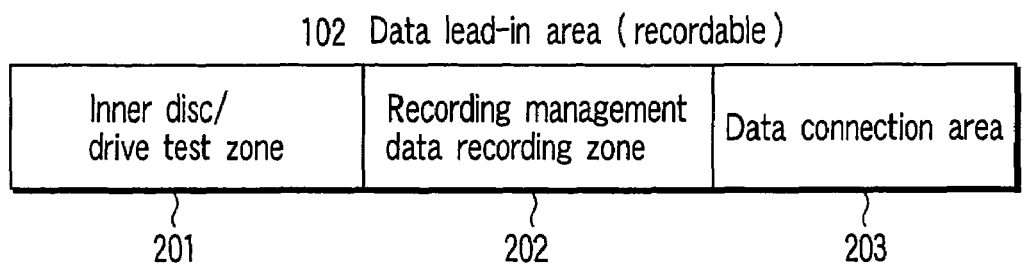
FIG. 2 is a diagram showing an example of the area configuration of a data lead-in area 102 shown in FIG. 1.

As shown in FIG. 2, the data lead-in area 102 includes an inner disc or drive test zone 201, recording management data recording zone 202 and data connection area 203. The inner disc or drive test zone 201 is used as an area which stores test data used by the optical disk apparatus to optimize the recording waveform before user data and management information are recorded on the optical disk.

Figure 4:
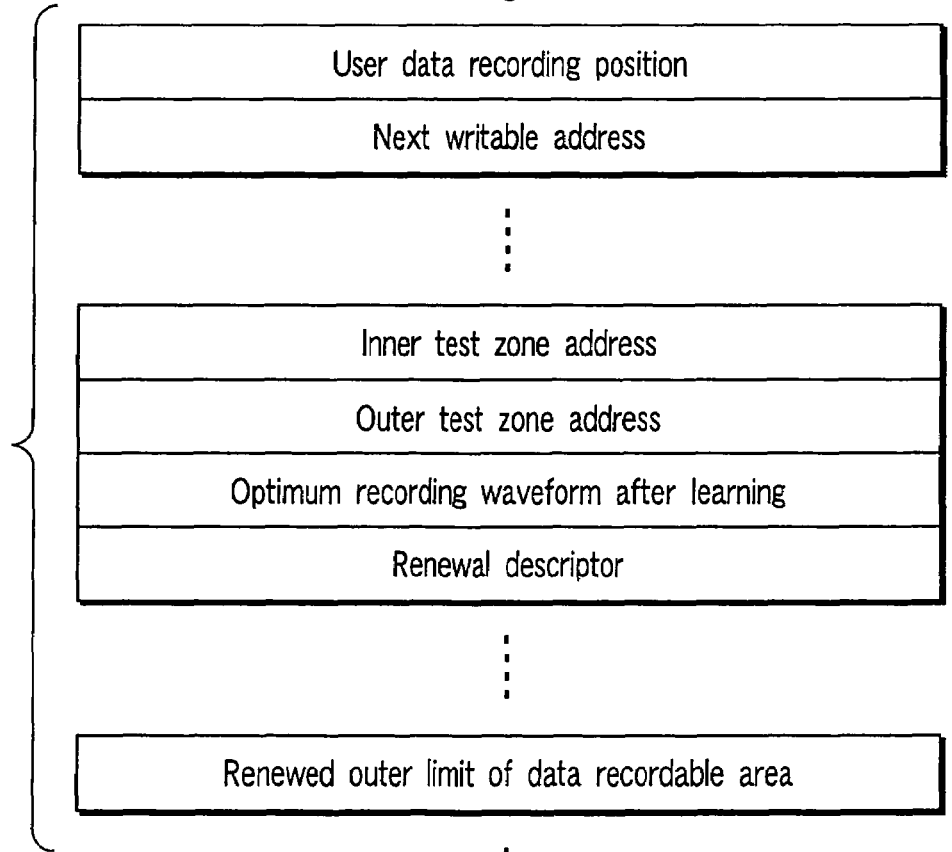
FIG. 4 is a diagram showing one example of the contents of management information in a recording management data recording zone 202 shown in FIG. 2.

Further, as shown in FIG. 4, in the recording management data recording zone 202, user data recording position information, Next writable address which indicates allowed recording start point, inner test zone address which shows recorded positions in the inner drive test zone and outer test zone address, and management information for an optimum recording wave after a learning process are set. In addition, information indicating Renewal descriptor, that is, information (status information of the protection area) indicating whether the learning area is expanded or not and management information for the end position of the data area in Renewed outer limit of Data Recordable area updated when the end position of the data area is changed are recorded.

In the additionally writable disk, information can't be overwritten. Therefore, the above management information should be modified and recorded as one block. The block is generally treated as the same unit as an error correction unit. That is, if at least part of the contents is updated, the whole block of the management information is used as a unit and information is additionally recorded in a direction from the internal circumference side to the outer circumference side of the management information recording area of the disk.

The data connection area 203 is also called a lead-in area and included physical format information used when information is reproduced from the recorded optical disk medium by use of the reproduction-only optical disk apparatus is recorded in this area. Some information in the data connection area is same information as recording management data recording zone.

Further, the area has a function of acting as an approach run and overrun permission area when the reproduction-only optical disk apparatus performs the tracking control operation for recording pits.

User data is recorded in the data area 103. Further, when a disk on which user data is recorded is taken out to be reproduced by use of the reproduction-only optical disk apparatus, an area which is called a lead-out area or border area is provided after the user data.

The border area is divided into a border-out area and border-in area. Information indicating division of the user data is recorded in the border-out area and the border-out area has a function of acting as an overrun permission area when the reproduction-only optical disk apparatus performs the tracking control operation for recording pits.

The border-in area has the same function as the lead-in area. In the lead-out area, information indicating the end of user data is recorded and the lead-out area has a function of acting as an overrun permission area when the reproduction-only optical disk apparatus performs the tracking control operation for recording pits.

The guard track zone 104 is an area provided between the outer disc or drive test zone 105 and the data area 103. The guard track zone 104 has a function of acting as a buffer area which prevents data recorded in the data area 103 from being erroneously destroyed when the recording wave optimizing process is executed.

In this invention, attention is paid to the utilizing method of the guard track zone 104. The guard track zone 104 is also used as an area which records the lead-out area when user data is recorded to the end position of the data area 103.

In addition, in the optical disk of this invention, the guard track zone 104 can be used as an expanded outer circumference side learning area when the outer disc or drive test zone 105 becomes unusable. For this purpose, it is preferable for the guard track zone 104 to have the same recording capacity as the outer disc or drive test zone 105.

Like the inner disc or drive test zone 201, the outer disc or drive test zone 105 is used as a test data recording area which optimizes the recording wave.

(Basic Explanation for Optical Disk Apparatus)

Figure 5:
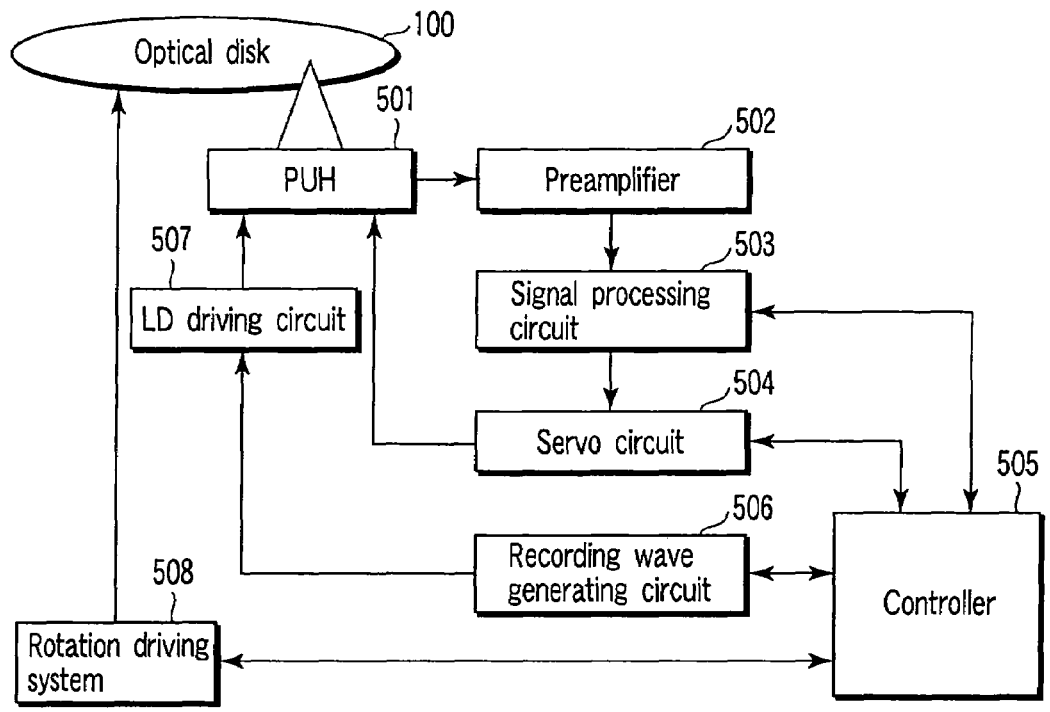
FIG. 5 is a diagram showing an example of the block configuration of an optical disk apparatus according to this invention.

The configuration of the optical disk apparatus according to one embodiment of this invention is shown in FIG. 5. The optical disk apparatus of this invention records or reproduces information by condensing laser light emitted from a pickup head (PUH) 501 onto the information recording layer of the optical disk 100. Light emitted from the optical disk 100 passes through the optical system of the PUH 501 again and is detected as an electrical signal by use of a photodetector. The thus detected electrical signal is amplified by a preamplifier 502 and output to a signal processing circuit 503 and servo circuit 504.

In the servo circuit 504, servo signals for focusing and tracking are generated and the signals are output to the focusing and tracking actuators of the PUH 501.

In the signal processing circuit 503, user data and information such as management information and address information are taken out from the reproduced signal and output to a controller 505.

The controller 505 performs a control operation to read out data such as user data in a desired position based on address information and record user data and management information in a desired position. At this time, a signal to be recorded is modulated into a recording waveform control signal suitable for the optical disk recording operation by a recording waveform circuit 506. An LD driving circuit 507 drives the laser diode (LD) to emit light according to the thus obtained signal and records information on the optical disk 100. Further, the controller 505 controls a rotation driving system 508 so as to stably rotate the optical disk 100.

(Explanation for Recording Waveform)

Figure 6:
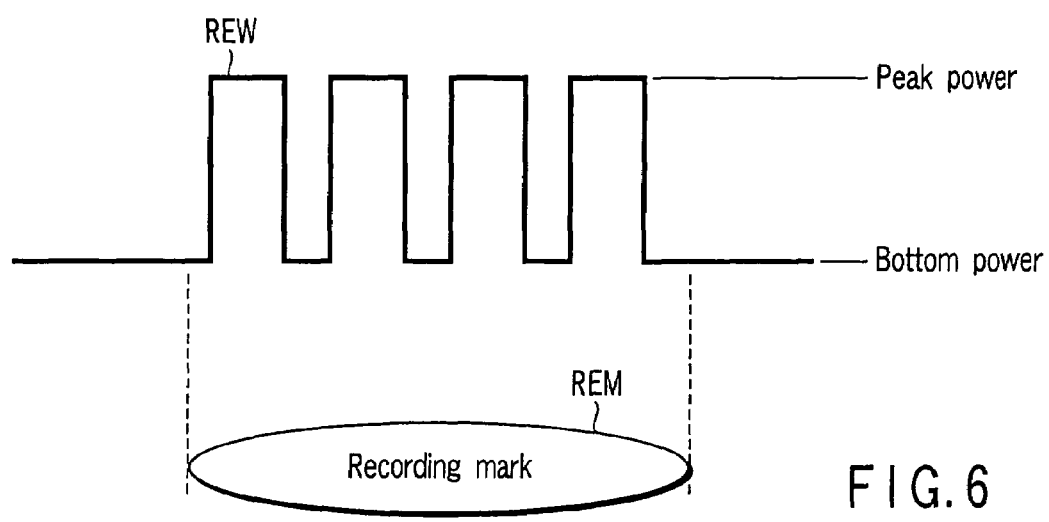
FIG. 6 is an explanatory diagram showing one example of a recording wave REW output from a laser diode (LD) of the optical disk apparatus according to this invention and a mark recorded on the optical disk.

FIG. 6 shows one example of a recording wave REW output from the laser diode (LD). In the recording wave, power which is called peak power is output at a timing at which a mark is recorded on the optical disk. Further, the recording wave REW is divided into a plurality of short pulses called a multi-pulse. The shape of a mark REM to be recorded can be changed by controlling the rise and fall positions of a pulse, pulse width and power.

(Explanation for Learning Operation)

The optimization learning operation performed in the test zone 201, 105 is performed as follows. For example, test data is recorded for each sector of the learning area while the recording power is gradually changed. The number of errors of the recording data in each sector is evaluated based on the reproduction signal. Then, the sector containing the least number of errors is determined and the recording power used when data is recorded in the thus determined sector is used as optimum recording power.

(Recording Operation onto Optical Disk)

Figure 7C:
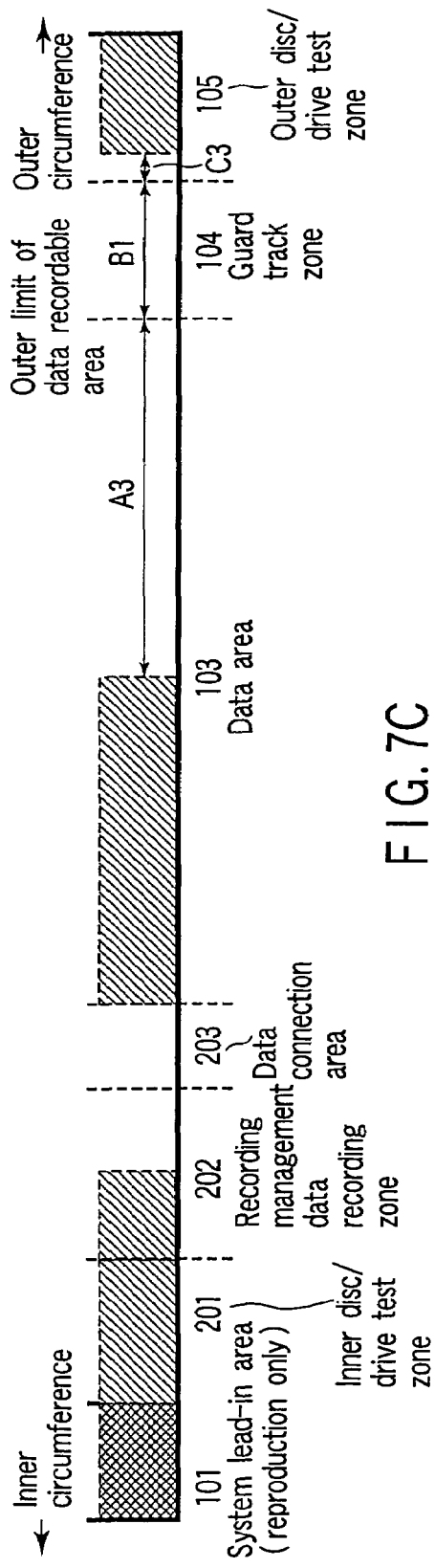

The recording operation is explained with reference to FIGS. 7A to 7C. The optical disk of this invention has the configuration as shown in FIG. 7A in the initial state in which no data is recorded. Information is previously recorded in the system lead-in area 101 by use of emboss pits and no user data is recorded in the other areas. At this time, the capacity of the user information recordable area (data area) 103 is A1, the capacity of the guard track zone 104 is B1 and the capacity of the outer test zone is C1.

The optical disk apparatus reproduces information of the system lead-in area 101 when the optical disk is inserted and reads the type of the optical disk, basic recording waveform information and the like. When the optical disk is an additionally writable optical disk, it reproduces information of the recording management data recording zone 202 and confirms the type of a recorded signal, the remaining capacity of the test zone, the remaining capacity of the management zone, the remaining capacity of the user data area 103 and the like.

Next, the recording waveform is optimized in at least one of the internal and outer test zones 201, 105 with reference to basic recording waveform information before user data is recorded. Data is recorded from the outer side toward the inner side of the disk in each of the learning areas 201, 105. If optimization of the recording waveform is completed, the operation of recording user data in the data area 103 is started. Further, when the operation of recording user data is interrupted or when a preset amount of user data has been recorded, management information is recorded in the recording management data recording zone 202.

On the other hand, when a stop state is sustained for a long period of time or when the temperature in the apparatus is changed, the operation of optimizing the recording waveform is performed in the learning area.

At this time, the optical disk is set in a state as shown in FIG. 7B. The remaining capacity of each area of the optical disk gradually becomes smaller as more user data is recorded. For example, the remaining capacity of the data area 103 is A2 and the remaining capacity of the outer disc or drive test zone 105 is C2. When one of the remaining capacities of the data area 103, test zone and recording management data recording zone 202 is used up, it becomes impossible to record information onto the optical disk. Therefore, the optical disk apparatus adequately confirms the remaining capacities of the test zone, recording management data recording zone and user area.

The amount of capacity of each area consumed varies depending on the type of the optical disk medium, apparatus and user data. For example, when the quality of the medium is bad and large capacity is required for each process of optimizing the recording wave, only the remaining capacity of the test zone is extremely reduced in some cases even if certain amounts of remaining capacities of the areas for user data and management information are left over.

If the remaining capacity of the test 105 becomes less than or equal to preset capacity C3 when a certain amount of capacity (capacity A3) of the data area 103 is left over as shown in FIG. 7C, the guard track zone 104 is effectively used to perform the optimization learning process for the recording waveform in the optical disk of this invention. In this case, C3 is set to approximately equal to capacity used for one optimization learning process for the recording waveform.

Figure 8A:
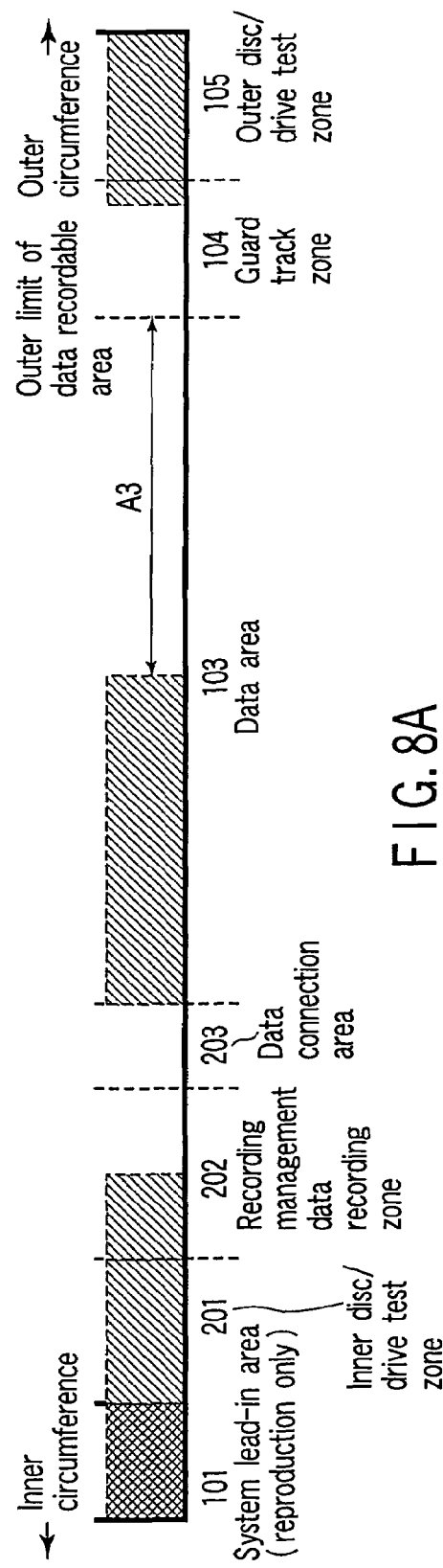
FIGS. 8A to 8C are explanatory diagrams showing variations in the capacity on the optical disk, for illustrating the operation of the apparatus according to this invention.

The state is shown in FIG. 8A. In this state, part of the guard track zone 104 is used as a extended drive test zone. When the learning process is thus performed by use of the guard track zone 104, information indicating that the guard track zone 104 is used as an extended drive test zone is recorded as management information in the recording management data recording zone 202 (also shown in FIG. 4).

Figure 8B:
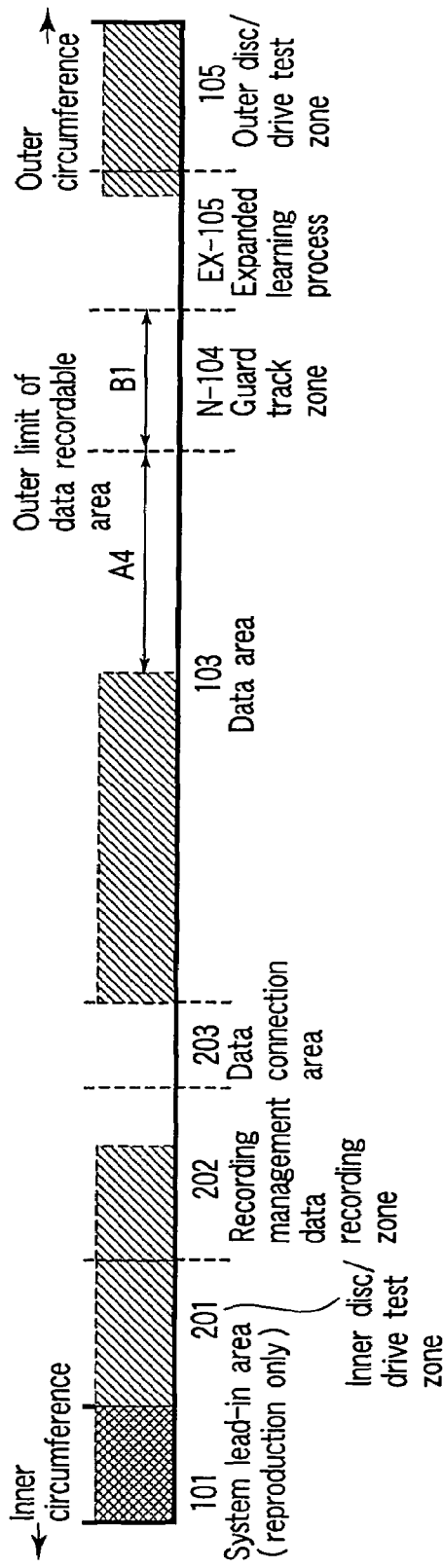
Figure 8C:

Further, for protection of user data, the outer limit of the data recordable area is shifted towards the internal circumference side by capacity B1 and recorded as the end position of the updated data area in the recording management data recording zone 202. As a result, as shown in FIGS. 8B, 8C, the prior guard track zone 104 is used as an extended drive test zone EX-105 and part of the user data area 103 is newly set as a guard track zone N-104. At this time, if the prior guard track zone 104 has the same capacity as the outer test zone 105, an advantage that the optical disk apparatus can simply calculate the remaining capacity of the test zone EX-105 can be attained. It is preferable to set the capacity of the guard track zone 104 before expansion of the learning area equal to the capacity of the newly set guard track zone N-104.

When the optical disk on which user data has been recorded is taken out from the optical disk apparatus in order to reproduce data from the optical disk by use of the reproduction-only optical disk apparatus, the data connection area 203 is recorded and the border-out area or lead-out area is recorded after user data. The first half of the above process is called a close process and the latter half is called a finalize process. Since the lead-out area is an area which indicates the end of the user data, user data cannot be additionally recorded after the finalize process.

(Expansion of Learning Area)

Figure 9:
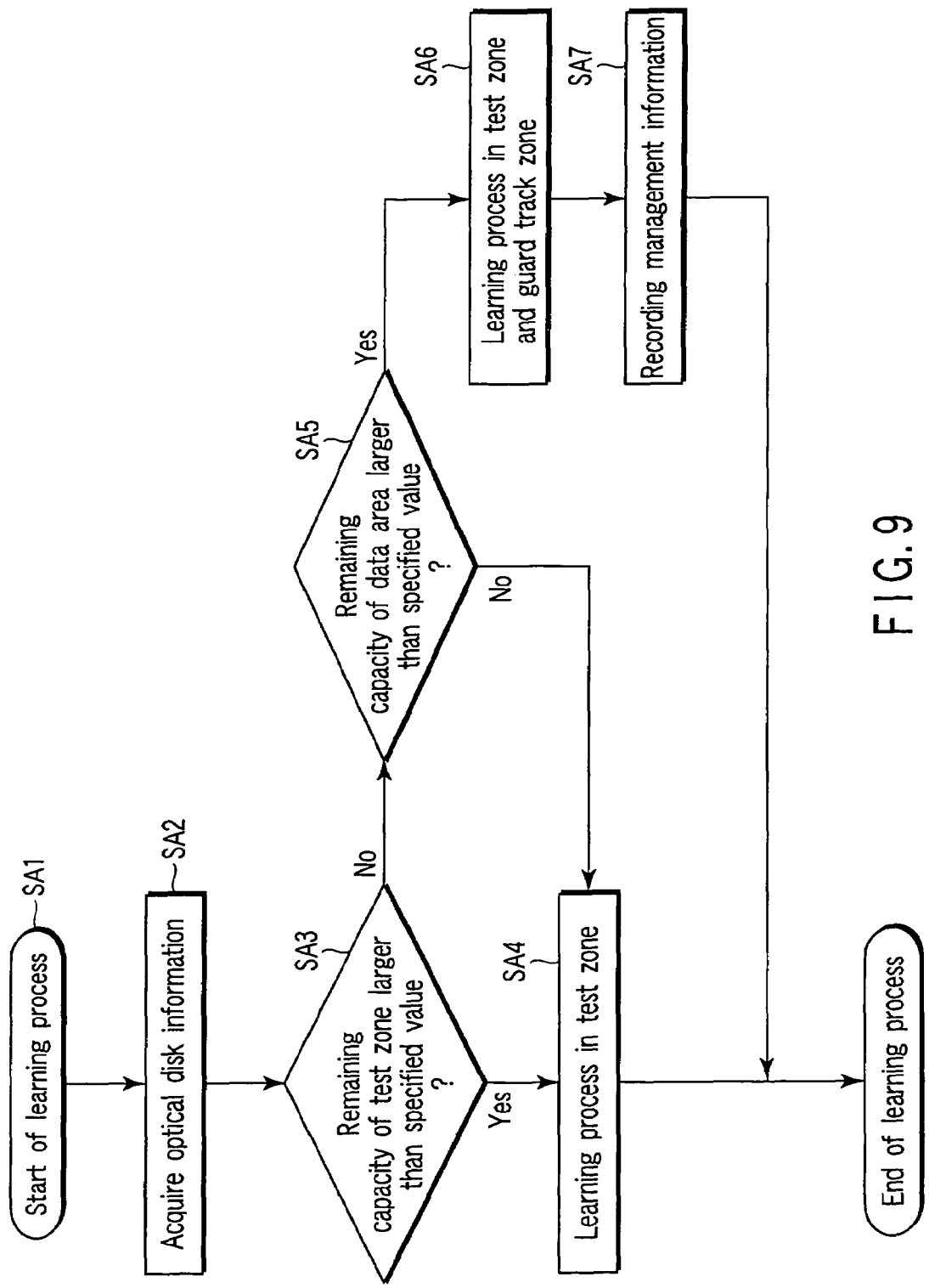
FIG. 9 is a flowchart for illustrating the operation of the apparatus according to this invention.

Next, the procedure of using the learning area is explained with reference to the flowchart of FIG. 9. When the optimization learning process for the recording waveform is started, the optical disk apparatus first confirms the state of the optical disk. The optical disk apparatus acquires the remaining capacities of the data area and test zone by performing the reproduction process for management information and the blank searing operation (steps SA1, SA2).

Next, the remaining capacity of the test zone is determined (step SA3). If the remaining capacity of the test zone exceeds preset capacity, the optical disk apparatus performs the normal learning operation in the learning area and completes the learning operation (step SA4). If required, information indicating the position where the learning operation is performed, optimized recording waveform and the like are recorded as management information on the optical disk. Next, if the remaining capacity does not exceed the preset capacity, the optical disk apparatus determines the remaining capacity of the data area (step SA5).

If the remaining capacity of the data area is smaller than the capacity B1 or smaller than preset capacity, the optical disk apparatus performs the learning operation for optimization of the recording waveform in the remaining portion of the learning area and completes the learning operation (steps SA5 to SA4). In this case, since the optical disk is set in the learning impossible state, it is preferable to perform the finalize process at this time and set the disk into an additionally writing impossible state.

If the remaining capacity of the data area exceeds the capacity B1 or preset capacity, the optical disk apparatus performs the learning operation for optimization of the recording waveform in the protection area in addition to the remaining portion of the test zone (step SA6). If the recording waveform is optimized, the optical disk apparatus records management information and completes the learning operation (step SA7). Management information recorded at this time contains information indicating that the guard track zone is used as the test zone and information indicating the changed outer limit of the data redeemable area in addition to information indicating the position in which the learning operation is performed and the optimized recording waveform. In this case, the changed outer limit of the data redeemable area is set to a position shifted towards the inner side from the end position of the prior data area by the capacity of the guard track zone. Thus, a portion used as the guard track zone before recording the management information is used as an extended drive test zone and part of the data area is used as the guard track zone.

Further, the determining operations in the respective steps are performed by use of a controller of the optical disk apparatus or a host or application of a computer connected to the optical disk apparatus.

As described above, since an area which is used to record information indicating a utilization method of the guard track zone is present in the recording management data recording zone or data connection area in the optical disk of this invention, the protection area, for example guard track zone, can be used to serve a plurality of purposes.

First, since the protection area lies between user data and a second learning area, it is possible to prevent user data from being destroyed at the learning time or prevent user data from being erroneously recorded in the learning area. Further, when the second learning area is used up, information indicating a protection area utilizing method can be recorded in the management information area. Therefore, the protection area can be used as an expanded learning area. As a result, it is possible to solve a problem that recording of user data is made impossible by using up the learning area although the data area is still available.

Since the recordable portion of the data area lies on the outer circumference side when the learning area is used up, the learning operation can be performed in a condition which is substantially equal to a recording condition of user data by expanding the learning area on the outer circumference side. Further, since the protection area lies between the user data area and the outer circumference side learning area, it is possible to prevent user data from being destroyed at the learning time or prevent user data from being erroneously recorded in the learning area. At this time, it is further possible to continuously use the area from the outer circumference side learning area when the protection area is used as the expanded learning area and, as a result, the load on the optical disk apparatus is alleviated.

If the protection area is used as the learning area, information indicating that the protection area is used as the learning area can be recorded in an area which is used to record information indicating a protection area utilization method. Therefore, it becomes possible to prevent occurrence of a problem that user data is erroneously destroyed during the learning operation and a pattern other than the pattern for learning is erroneously recorded in the learning area.

Further, since an area in which information indicating the end of the updated user data area is recorded is provided, the end position of the user data can be changed while the disk is being used. Thus, if the protection area is used as the expanded learning area, the end position of the user data can be moved to the inner circumference side, an area between the thus moved end position and the expanded learning area can be used as a second protection area and user data can be prevented from being destroyed.

If the protection area is used as a third learning area, the capacity thereof becomes equal to that of the second learning area and the remaining capacity of the learning area can be calculated in the same manner. Thus, the load of the optical disk apparatus which records/reproduces data with respect to the optical disk can be alleviated.

When it becomes impossible to use the basic learning area even if the data area is sufficiently left over, the data area can be efficiently used by expanding the learning area.

This invention is not limited to the above embodiment and can be variously modified without departing from the technical scope thereof at the embodying stage thereof. Further, various inventions can be made by adequately combining a plurality of constituents disclosed in the embodiment. For example, some constituents can be omitted from the whole constituents shown in the above embodiment. In addition, constituents over the different embodiments can be adequately combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical disk apparatus which records data on an optical disk having a data area, protection area and learning area, comprising:

a function of calculating remaining capacities of the data area and learning area, a function of comparing the remaining capacity of the data area with a first specified value, a function of comparing the remaining capacity of the learning area with a second specified value, and a function of using the protection area as a learning area when the remaining capacity of the data area exceeds the first specified value and the remaining capacity of the learning area is smaller than the second specified value.

2. An optical disk information recording method which records data on an optical disk having a data area, protection area and learning area, comprising:

a step of calculating remaining capacities of the data area and learning area, a step of comparing the remaining capacity of the data area with a first specified value, a step of comparing the remaining capacity of the learning area with a second specified value, and a step of using the protection area as a learning area when the remaining capacity of the data area exceeds the first specified value and the remaining capacity of the learning area is smaller than the second specified value.

* * * * *